United States Patent
Sasabe et al.

(10) Patent No.: US 8,907,246 B2
(45) Date of Patent: Dec. 9, 2014

(54) FLUX-CORED WIRE FOR WELDING DIFFERENT MATERIALS, METHOD FOR LASER WELDING OF DIFFERENT MATERIALS AND METHOD FOR MIG WELDING OF DIFFERENT MATERIALS

(75) Inventors: Seiji Sasabe, Fujisawa (JP); Tsuyoshi Matsumoto, Fujisawa (JP)

(73) Assignee: Kabushiki Kaisha Kobe Seiko Sho, Kobe-shi (JP)

( * ) Notice: Subject to any disclaimer, the term of this patent is extended or adjusted under 35 U.S.C. 154(b) by 647 days.

(21) Appl. No.: 13/225,845

(22) Filed: Sep. 6, 2011

(65) Prior Publication Data

US 2012/0074111 A1 Mar. 29, 2012

(30) Foreign Application Priority Data

Sep. 29, 2010 (JP) ................. 2010-219689

(51) Int. Cl.
*B23K 26/22* (2006.01)
*B23K 35/362* (2006.01)
(Continued)

(52) U.S. Cl.
CPC ........... *B23K 35/0266* (2013.01); *B32K 26/123* (2013.01); *B23K 26/14* (2013.01);
(Continued)

(58) Field of Classification Search
CPC .... B23K 26/123; B23K 26/14; B23K 26/203; B23K 26/243; B23K 26/3226; B23K 26/3233; B23K 26/0266; B23K 35/286; B23K 35/3605; B23K 35/368; B23K 35/362; B23K 2201/06; B23K 2201/185; B23K 2203/10; B23K 2203/20

USPC ............... 219/121.64, 137 R, 146.22, 146.31
See application file for complete search history.

(56) References Cited

U.S. PATENT DOCUMENTS 2,043,855 A 6/1936 Keller
3,544,761 A * 12/1970 Rosenberg ................ 219/137 R
(Continued)

FOREIGN PATENT DOCUMENTS

CN 101351298 1/2009
CN 101378873 A 3/2009
(Continued)

OTHER PUBLICATIONS

French Written Opinion issued Aug. 9, 2012 in Patent Application No. FR1162202 with English Translation.

(Continued)

*Primary Examiner* — Geoffrey S Evans
(74) *Attorney, Agent, or Firm* — Oblon, Spivak, McClelland, Maier & Neustadt, L.L.P.

(57) ABSTRACT

There are provided a flux-cored wire for welding different materials, a method for laser welding of different materials and a method for MIG welding of different materials which can improve tensile shear strength of a welded joint portion and peeling strength of a welded portion interface in welding aluminum or an aluminum alloy material and a steel material. The flux-cored wire has a cylindrical sheath comprising an aluminum alloy which contains Si in an amount of 1.5 to 2.5% by mass and Zr in an amount of 0.05 to 0.25% by mass, with the remainder being aluminum and inevitable impurities, and a flux filling inside this sheath and containing cesium fluoride in an amount of 20 to 60% by mass, and the packing fraction of the flux being 5 to 20% by mass of the total mass of the wire.

11 Claims, 3 Drawing Sheets

(51) Int. Cl.
*B23K 35/12* (2006.01)
*B23K 35/02* (2006.01)
*B23K 26/14* (2014.01)
*B23K 26/20* (2014.01)
*B23K 26/24* (2014.01)
*B23K 26/32* (2014.01)
*B23K 35/28* (2006.01)
*B23K 35/36* (2006.01)
*B23K 35/368* (2006.01)
*C22C 21/00* (2006.01)
*C22C 21/02* (2006.01)

(52) U.S. Cl.
CPC ............ B23K 26/203 (2013.01); B23K 26/243 (2013.01); B23K 26/3226 (2013.01); B23K 26/3233 (2013.01); B23K 35/0255 (2013.01); B23K 35/286 (2013.01); B23K 35/3605 (2013.01); B23K 35/362 (2013.01); B23K 35/368 (2013.01); C22C 21/00 (2013.01); C22C 21/02 (2013.01); B23K 2201/006 (2013.01); B23K 2201/185 (2013.01); B23K 2203/10 (2013.01); B23K 2203/20 (2013.01)
USPC .............. 219/121.64; 219/137 R; 219/146.22

(56) References Cited

U.S. PATENT DOCUMENTS 3,866,015 A * 2/1975 Matsumoto et al. ..... 219/146.52
4,689,092 A * 8/1987 Suzuki et al. ................... 148/26
2001/0010866 A1 * 8/2001 Sontgerath et al. ........... 428/654
2002/0012810 A1 * 1/2002 Osame et al. ............ 219/121.64
2008/0193792 A1   8/2008 Cottignies et al.
2009/0017328 A1 * 1/2009 Katoh et al. .................. 428/653
2012/0125900 A1 * 5/2012 Matsumoto et al. ..... 219/121.64

FOREIGN PATENT DOCUMENTS

| | | | |
|---|---|---|---|
| EP | 1 997 579 A1 | | 12/2008 |
| JP | 2003-211270 A | * | 7/2003 |
| JP | 2003-211270 A | | 7/2003 |
| JP | 2004-1085 A | | 1/2004 |
| JP | 2004-223548 A | | 8/2004 |
| JP | 2004-223548 A | * | 8/2004 |
| JP | 2006-224145 | | 8/2006 |
| JP | 2007-136525 A | | 6/2007 |
| JP | 2008-68290 | | 3/2008 |
| WO | WO 02/43913 A1 | | 6/2002 |
| WO | WO 2011/013620 A1 | | 2/2011 |

OTHER PUBLICATIONS

Korean Office Action Issued Mar. 21, 2013 in Patent Application No. 10-2011-0098233 (with English translation).
U.S. Appl. No. 13/388,177, filed Jan. 31, 2012, Matsumoto, et al.
Notification of Reasons(s) for Refusal issued Jan. 29, 2013 in Japanese Patent Application No. 2010-219689 (with English translation).

* cited by examiner

FLUX-CORED WIRE FOR WELDING DIFFERENT MATERIALS, METHOD FOR LASER WELDING OF DIFFERENT MATERIALS AND METHOD FOR MIG WELDING OF DIFFERENT MATERIALS

BACKGROUND OF THE INVENTION (1) Field of the Invention

The present invention relates to a flux-cored wire for welding different materials for use in welding different materials, for example, transport machinery such as automobiles and components for building materials and the like, and a method for laser welding of different materials and method for MIG welding different materials using this flux-cored wire for welding different materials, especially to a flux-cored wire for welding different materials suitable for use in welding between aluminum or an aluminum alloy material and a galvanized steel plate, a method for laser welding of different materials and a method for MIG welding of different materials.

(2) Description of the Related Art

Heretofore, in transport machinery such as automobiles, steel materials are used as materials for vehicle bodies and the like. Since steel materials used as components of transport machinery and the like are exposed to rain water and the like during use, antirust galvanizing is performed on their surfaces. Accordingly, a waterproof effect is provided by an oxide film formed on the galvanized surface, while zinc is corroded (sacrificial protection) preferentially to iron even when there are flaws, pin holes or the like on the surface of a steel material.

Recently, from the perspective of protecting the environment, research and development of hybrid automobiles, electric automobiles and the like has been rapidly conducted, weight reduction of vehicle bodies and the like of these automobiles are required to improve fuel efficiency and for other purposes. Moreover, in order to achieve weight reduction of vehicle bodies and other parts, constituting part of steel materials used as materials by aluminum or aluminum alloy materials (hereinafter aluminum materials and aluminum alloy materials are collectively referred to as aluminum alloy materials) has been studied.

Therefore, producing vehicle bodies and the like requires different-material bonding between a steel material and an aluminum alloy material. Examples of different-material bonding techniques between a steel material and an aluminum alloy material include a method of bonding by MIG welding or laser welding between base materials while feeding a flux-cored wire (Japanese Unexamined Patent Publication No. 2008-68290).

In this prior art, the compositions of the outer sheath of the flux-cored wire is defined to be Si: 1 to 13%, and a fluoride-based flux containing no chloride is charged into the outer sheath at a packing fraction of 0.3 to 20% by mass.

In addition, in order to improve the bonding strength of a bonded structure of different materials, a filler metal in which the amount of Si contained is 1.5 to 6.0%, and further Zr is contained as an additive component in an amount of 0.1 to 0.2% by mass has been suggested (Japanese Unexamined Patent Publication No. 2006-224145).

MIG (Metal Inert Gas: MIG) welding is a method of feeding an inert gas such as argon or helium to the vicinity of a site to be bonded as a shielding gas and generating an arc between a welding wire and the site to bond a steel material and an aluminum alloy material. This MIG welding is characterized in that welding operation is carried out in a state of being blocked from the atmosphere, and therefore welding proceeds without being affected by oxygen in the air. In contrast, laser welding comprises feeding a welding wire to a joint portion while this welding wire and joint portion are irradiated with laser light so that the welding wire and the joint portion are thermally fused by the laser light.

However, the aforementioned prior art has the following problems: in a structure such as a vehicle body of an automobile, in the case where a steel material and an aluminum alloy material are butt-welded, tensile stress acts between base materials when an external force is applied to the welded joint portion. Meanwhile, in the case where, for example, a steel material and an aluminum alloy material are overlapped and welded, and when an external force is applied to the welded joint portion, tensile stress acts between the base materials, and at the same time peeling stress which pulls the two base materials away from each other acts on the weld interface. Therefore, when different materials are welded, not only tensile shear strength but also high peeling strength (peel strength) is required for the welded joint portion. However, when a steel material and an aluminum alloy material are bonded by welding as in a conventional case, a highly brittle intermetallic compound is produced at the bonded portion, which causes the problem that the tensile shear strength and peeling strength of the bonded portion are lower than in the case where the same type of components are welded.

In contrast, in the case where different-material welding is performed by using the flux-cored wire disclosed in Japanese Unexamined Patent Publication No. 2008-68290, production of this highly brittle intermetallic compound can be suppressed, and the thickness of the intermetallic compound layer can be reduced.

However, the tensile shear strength after welding is increased in an area where the amount of Si contained in the filler metal is high, but peeling strength is disadvantageously lowered. Moreover, although peeling strength is improved in an area with a low amount of Si and peeling does not occur in the intermetallic compound layer, when there is a large difference in heat expansion between the aluminum material and the steel material (for example, the case where the thickness of the aluminum material is larger than that of the steel material, etc.), cracks disadvantageously occur in the welded portion (welded metal portion) due to the thermal shrinkage of the welded portion.

In contrast, as in Japanese Unexamined Patent Publication No. 2006-224145, it is also possible to keep the amount of Si in a solid filler metal to a relatively low level of 1.5 to 6% and further add Zr as an optional component as appropriate.

However, when the amount of Si is relatively high, or depending on the main compositions and packing fraction of the flux in the flux-cored wire, formation of an intermetallic compound layer cannot be effectively suppressed, and high peeling strength cannot be obtained.

SUMMARY OF THE INVENTION

In view of such problems, it is an object of the present invention to provide a flux-cored wire for welding different materials, a method for laser welding of different materials and a method for MIG welding of different materials which, when aluminum or an aluminum alloy material and a steel material are welded, can improve tensile shear strength of a welded joint portion and peeling strength of a welded portion interface, and can make a welded metal portion free of cracks.

The flux-cored wire for welding different materials according to the present invention is a flux-cored wire for welding different materials for use in different-material bonding between aluminum or an aluminum alloy material and a steel material, the flux-cored wire having a cylindrical sheath composed of an aluminum alloy which contains Si in an amount of 1.5 to 2.5% by mass and Zr in an amount of 0.05 to 0.25% by mass, with the remainder being aluminum and inevitable impurities, and a flux filling inside this sheath and containing cesium fluoride in an amount of 20 to 60% by mass, and the packing fraction of the flux being 5 to 20% by mass of the total mass of the wire.

Furthermore, another flux-cored wire for welding different materials according to the present invention is a flux-cored wire for welding different materials for use in different-material bonding between aluminum or an aluminum alloy material and a steel material, the flux-cored wire having a cylindrical sheath composed of an aluminum alloy which contains Si in an amount of 1.5 to 2.5% by mass and Zr in an amount of 0.05 to 0.25% by mass, with the remainder being aluminum and inevitable impurities, and a flux filling inside this sheath and containing $AlF_3$ in an amount of 7 to 15% by mass, and the packing fraction of the flux being 4 to 20% by mass of the total mass of the wire.

The method for laser welding of different materials according to the present invention comprises using the above flux-cored wire for welding different materials, constituting a joint portion by aluminum or an aluminum alloy material and a steel material, and bonding the aluminum or aluminum alloy material and the steel material by feeding the flux-cored wire for welding different materials while irradiating this joint portion with laser light.

The method for MIG welding of different materials according to the present invention comprises using the above flux-cored wire for welding different materials, constituting a joint portion by aluminum or an aluminum alloy material and a steel material, forming an arc between the joint portion and the flux-cored wire for welding different materials, supplying an inert gas around the arc, and at the same time bonding the aluminum or aluminum alloy material and the steel material.

In the flux-cored wire for welding different materials of the present invention, the amounts of cesium fluoride contained in the flux and Si contained in the sheath contained are appropriately defined. Therefore, using the wire in different-material laser welding or different-material MIG welding between aluminum or an aluminum alloy material and a steel material can improve the tensile shear strength of a welded joint portion and peeling strength of a welded portion interface.

In addition, since Zr is added in a predetermined amount as an essential composition in addition to Si, a welded metal portion can be free of cracks even when the difference in heat expansion between the steel material and the aluminum material is large due to the grain refining effect of Zr. Furthermore, the addition of Zr improves joint strength compared to a filler metal with only Si added.

Furthermore, since the packing fraction of the flux is appropriately defined, the reducing effect of the flux can be effectively obtained, and the tensile shear strength of the welded joint portion and the peeling strength at the weld interface can be further effectively improved. It should be noted that the reducing effect of the flux is presumably such that in different-material laser welding or different-material MIG welding between aluminum or an aluminum alloy material and a steel material, reduction and removal of an oxide film on the surface of aluminum and a galvanized layer and a surface oxide film of the steel material are made easier due to the activation of the flux by welding heat. In such a manner, in the different-material laser welding or different-material MIG welding, by removing plated layers of base materials to be bonded and oxide films on the surfaces of the base materials, newly generated metallic interfaces occur on the outermost layers of the base materials. Therefore, the base materials are strongly bonded to each other, and the tensile shear strength and peeling strength of the welded joint portion are improved. When the steel plate is a non-galvanized steel plate, the oxide film on the surface of the steel plate can be suppressed by a predetermined amount of the flux having a predetermined chemical composition. As a result, the base materials of aluminum or an aluminum alloy material are strongly bonded to each other, and the tensile shear strength and peeling strength of the welded joint portion are improved.

According to the method for laser welding or MIG welding of different materials of the present invention, in different-material bonding between aluminum or an aluminum alloy material and a steel material, the tensile shear strength of the welded joint portion and the peeling strength at the welded portion interface can be improved, and cracks in a molten metal portion occurring when the difference in heat expansion between a steel material and an aluminum material is large can be prevented.

Furthermore, in the method for laser welding of different materials of the present invention, using a semiconductor laser as a laser source reduces unevenness of a molten bead, thereby obtaining a beautiful and sound welding structure.

DETAILED DESCRIPTION OF THE INVENTION

Figure 1:
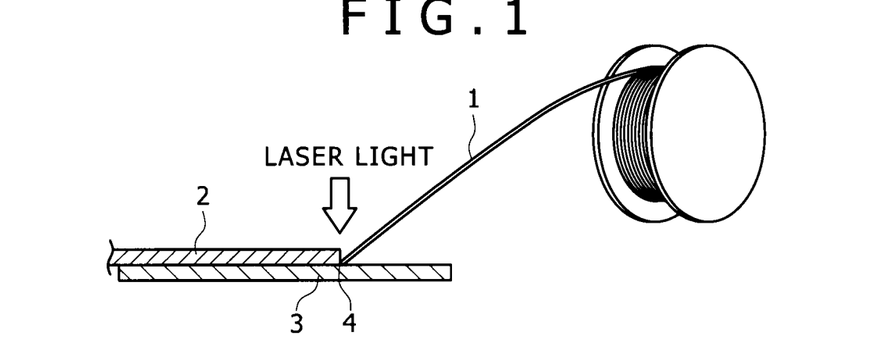
FIG. 1 is a schematic diagram which illustrates lap welding by the method for laser welding of different materials of the present invention.
Figure 2:
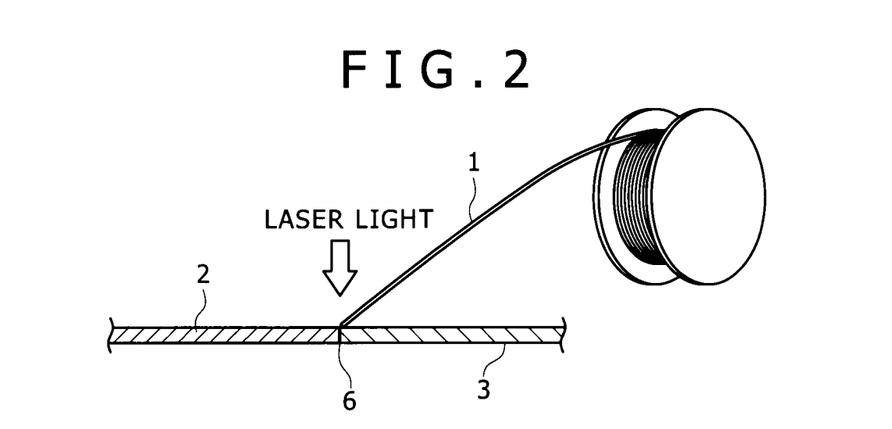
FIG. 2 is a schematic diagram which illustrates butt welding by the method for laser welding of different materials of the present invention.

Embodiments of the present invention will be described below in detail. FIG. 1 is a schematic diagram which illustrates lap welding by the method for laser welding of different materials of the present invention; FIG. 2 is a schematic diagram which illustrates butt welding by the method for laser welding of different materials of the present invention; and FIGS. 5A to 5D are drawings which illustrate an example of the flux-cored wire for welding different materials. When lap welding is performed by the method for laser welding of different materials of the present invention, as shown in FIG. 1, for example, an aluminum alloy material 2 is disposed on the side of laser light, and a plate-like aluminum alloy material 2 and a steel material 3 are lapped. A lapped portion 4 of the aluminum alloy material 2 and the steel material 3 is irradiated with laser light while a flux-cored wire for welding different materials 1 is fed to the lapped portion 4 to perform laser welding, whereby the aluminum alloy material 2 and the steel material 3 are bonded. When butt welding is performed by the method for laser welding of different materials of the present invention, as shown in FIG. 2, the plate-like aluminum alloy material 2 and the steel material 3 are abutted, and an abutment portion 6 of these is irradiated with laser light while the flux-cored wire 1 for laser welding of different materials is fed to the abutment portion 6 to perform laser welding. Usable laser light emitting devices include YAG laser, $CO_2$ laser and fiber laser, semiconductor laser and various other devices, among which semiconductor laser is the most preferable in terms of the appearance of weld bead.

Examples of usable materials of the aluminum alloy material 2 include JIS A 1000 series, A 2000 series (Al—Cu-based alloy), A 3000 series (Al—Mn-based alloy), A 4000 series (Al—Si-based alloy), A 5000 series (Al—Mg-based alloy), A 6000 series (Al—Mg—Si-based alloy) and A 7000 series (Al—Zn—Mg-based alloy, Al—Zn—Mg—Cu-based alloy). In addition, a plate material having, for example, a thickness of 0.5 to 4.0 mm can be used as the aluminum alloy material 2.

Examples of usable steel materials include SPCC (cold-rolled low-carbon steel sheet), high tensile strength steel and various other steel materials. In particular, a preferable steel material is a galvanized steel plate processed by hot-dip galvanizing (GA steel plate, GI steel plate). As the steel material 3, for example, a plate material having a thickness of 0.5 to 4.0 mm can be used, wherein the thickness may be different from that of the aluminum alloy material 2.

The flux-cored wire for welding different materials 1 is, for example, as shown in FIGS. 5A to 5D, a cylindrical sheath 1a made of an aluminum alloy which is filled a flux 1b, and the outer diameter of the wire 1 is, for example, 0.8 to 1.6 mm. In the present invention, the packing fraction of the flux 1b in the wire 1 is 5 to 20% by mass of the total mass of the wire. In addition, the flux 1b of the present invention contains cesium fluoride in an amount of 20 to 60% by mass.

In addition, the flux of the flux-cored wire according to a second invention of the present invention has a flux containing $AlF_3$ in an amount of 7 to 15% by mass, and the packing fraction of the flux being 4 to 20% by mass of the total mass of the wire.

The aluminum sheath 1a of the above-mentioned flux-cored wires contains Si in an amount of 1.5 to 2.5% by mass and Zr in an amount of 0.05 to 0.25% by mass, with the remainder being formed of an aluminum alloy comprising aluminum and inevitable impurities. Examples of inevitable impurities in this aluminum sheath 1a include Mg, Mn and Fe, and their amounts contained are each 0.1% by mass or lower of the total mass of the sheath.

The reasons for limitation of the numerical values in the chemical composition of the flux-cored wire for welding different materials of the present invention will be now described.

"The Amount of Cesium Fluoride Contained in the Flux: 20 to 60% by Mass of the Total Mass of the Flux"

Cesium fluoride functions to suppress generation of a highly brittle intermetallic compound between an aluminum alloy material and a galvanized steel material during laser welding. When the amount of cesium fluoride contained in the flux is lower than 20% by mass, the effect of suppressing the generation of the highly brittle intermetallic compound is low, which leads to lowered tensile shear strength and peeling strength. On the other hand, when the amount of cesium fluoride contained in the flux is higher than 60% by mass, the improvement effect of the function to suppress the generation of the highly brittle intermetallic compound is saturated, while an increase in the amount of costly cesium contained increases the production costs of the flux-cored wire for welding different materials. Therefore, in the present invention, the amount of cesium fluoride contained in the flux is defined to be 20 to 60% by mass of the total mass of the flux. As examples of compositions in the flux other than cesium fluoride, aluminum fluoride, potassium fluoride, potassium aluminum fluoride, lanthanum fluoride and the like can be suitably contained in combination. Aluminum fluoride, potassium fluoride and potassium aluminum fluoride are so-called potassium aluminum-based fluoride compounds, which are considered to have functions such as removal of aluminum oxide film, promotion of fusion of the wire at a low melting point, ensuring wettability and a barrier for suppressing diffusion at the interface between the steel material and the aluminum material.

"The Amount of $AlF_3$ Contained in the Flux: 7 to 15% by Mass of the Total Mass of the Flux"

$AlF_3$ functions to suppress generation of the highly brittle intermetallic compound between the aluminum alloy material and the galvanized steel material during laser welding and MIG welding. Examples of compositions contained in the flux other than $AlF_3$ include suitable combination of KAl, KF and the like. When the amount of $AlF_3$ contained in the flux is lower than 7% by mass, the effect in suppressing generation of the highly brittle intermetallic compound is low, which leads to lowered tensile shear strength and peeling strength. On the other hand, when the amount of $AlF_3$ contained in the flux is higher than 15% by mass, the improvement effect of the function to suppress the generation of the highly brittle intermetallic compound is saturated, and peeling strength is also lowered. Therefore, in the present invention, the amount of $AlF_3$ contained in the flux is defined to be 7 to 15% by mass of the total mass of the flux.

"The Amount of Si Contained in the Aluminum Alloy Constituting the Sheath: 1.5 to 2.5% by Mass, the Amount of Zr Contained: 0.05 to 0.25% by Mass"

Si contained in the aluminum alloy constituting the sheath is a composition which is essential for improving the tensile shear strength of the welded joint portion. When the amount of Si contained in the aluminum alloy is lower than 1.5% by mass, the peeling strength is improved to a certain degree, but the effect in improving the tensile shear strength of the welded joint portion is insufficient. In addition, when the amount of Si is lower than 1.5%, rupture is unlikely to occur at the interface of the bonded portion (brittle intermetallic compound), but if a difference in heat expansion between the steel material and the aluminum material is large, aluminum in the welded metal portion becomes more sensitive to cracks, and cracks occur not at the interface of the bonded portion but in a welded metal portion.

On the other hand, when the amount of Si contained in the aluminum alloy is higher than 2.5% by mass, lowered tenacity of portions near the bonded portion lowers peeling strength. Therefore, in the present invention, the amount of Si contained in the aluminum alloy constituting the sheath is set to be 1.5 to 2.5% by mass, and a predetermined amount of Zr is further added thereto.

Accordingly, with the amount of Si being 1.5 to 2.5%, the amount of Zr contained at which cracks in the welded metal portion can be prevented and peeling strength can be improved is 0.05 to 0.25% by mass. More preferably, the amount of Zr contained is 0.07 to 0.20% by mass.

It should be noted that Mn, Mg or Fe can be further contained in the sheath as inevitable impurities each in an amount of 0.1% by mass or lower of the total mass of the sheath.

"Flux Packing Fraction: 5 to 20% by Mass of the Total Mass of the Wire"

The flux has a reducing effect on the aluminum alloy material and steel material. When the packing fraction of the flux is lower than 5% by mass of the total mass of the wire, the reducing effect of the flux is lowered, and tensile shear strength and peeling strength are lowered. On the other hand, when the packing fraction of the flux is higher than 20% by mass of the total mass of the wire, the reducing action becomes excessively high, and tensile shear strength and peeling strength are lowered on the contrary. Therefore, in the present invention, the packing fraction of the flux is defined to be 5 to 20% by mass of the total mass of the wire.

It should be noted that in the above chemical compositions of the flux, the remainder other than those specified is substantially composed of KAlF, but this means that a KAlF-based flux is used as a main composition. Examples of such KAlF (potassium aluminum fluoride)-based fluxes include those containing 75% by mass of $KAlF_4$ and 25% by mass of $K_3AlF_6$. Alternatively, there are other fluxes containing these potassium aluminum fluoride-based compounds which are partly replaced with $K_2AlF_6$. Furthermore, fluxes containing no Al such as KF may also be included. Accordingly, a flux composed substantially of KAlF normally means, when a compound containing K, Al and F in an amount of 95% or higher, those which may contain KF and the like as other fluorides.

The method for laser welding of different materials using the flux-cored wire for welding different materials of this embodiment will be now described. First, a joint portion is constituted by the aluminum alloy material 2 and the steel material 3. For example, when the joint portion is produced by lap welding, as shown in FIG. 1, the plate-like aluminum material 2 and the steel material 3 are overlapped, and, for example, the aluminum alloy material 2 is disposed on the laser light side. In such a manner, disposing the aluminum alloy material 2 on the on the laser light side causes the aluminum alloy material 2 having a low melting point to fuse earlier than the steel material 3. Second, since the steel material 3 disposed below the aluminum alloy material 2 can be partly fused, and therefore dripping of the molten metal from a molten pool can be prevented more effectively and lap welding can be more smoothly performed than in the case where the steel material 3 is disposed on the on the laser light side and subjected to lap welding. When the joint portion is produced by butt welding, as shown in FIG. 2, the aluminum material 2 and the steel material 3 are abutted.

Subsequently, in a state that the welded joint portion is placed in an atmosphere of a shielding gas, for example, helium and argon, a focal position of laser light is adjusted, and the laser light is condensed on the vicinity of the lapped portion 4 or abutment portion 6 of the base materials. The flux-cored wire 1 for laser welding of different materials is then fed to the vicinity of the lapped portion 4 or abutment portion 6 of the base materials. When the aluminum alloy material 2 and the steel material 3 are bonded by lap welding, the aluminum alloy material 2 can be actively fused since the aluminum alloy material 2 is disposed on the laser light side. The surface oxide film on the surface of the steel material 3 is then reduced by the flux, and the steel interface is brought into contact with the molten metal of the aluminum alloy, so that the aluminum alloy material 2 and the steel material 3 are bonded by braze welding. It should be noted that braze welding between the aluminum alloy material 2 and the steel material 3 means fusing the aluminum alloy material 2 having a low melting point and bonding the aluminum alloy material 2 to the steel material 3 by using the fused aluminum alloy as a filler material. When the aluminum alloy material and a steel material is bonded by butt welding, the aluminum alloy material 2 and the steel material 3 are bonded by braze welding by feeding the flux-cored wire 1 for laser welding of different materials to the abutment portion 6, adjusting the focal position of the laser light to be the abutment portion 6 and irradiating the abutment portion 6 with laser light with the focal position. Accordingly, burn through of the molten metal can be prevented.

The aluminum alloy material 2 having a low melting point is fused first by radiating laser light. The steel material 3 is then fused, in which the surface layer on the steel plate is fused first. Thereafter, the flux-cored wire 1 for laser welding of different materials which has been fused also by radiating laser light is fed into these molten metal compositions.

The radiation position of the laser light is then moved along a weld line, whereby in a state that the fused aluminum alloy composition, plating compositions if the steel material is plated, the steel compositions and the flux-cored wire compositions are mixed, the molten metal is sequentially solidified behind the radiation position of the laser light along the welding direction to form a bead. At this time, an intermetallic compound is produced between the aluminum alloy material 2 and steel material 3 to be bonded. The flux-cored wire 1 for laser welding of different materials of this embodiment has an amount of cesium fluoride contained therein defined to have an appropriate value. Alternatively, the amount of $AlF_3$ contained is similarly defined to have an appropriate value.

Therefore, the amount of the intermetallic compound generated in the welded portion is, larger with, for example, FeAl, $Fe_3Al$ and the like, which do not lower brittleness, than with highly brittle $FeAl_3$ or $Fe2Al_5$. Therefore, the tensile shear strength and peeling strength of the welded joint portion can be improved for the former.

In addition, in the flux-cored wire 1 for laser welding of different materials, the amount of Si contained in the aluminum sheath 1a is defined to be in an appropriate range, and therefore tensile shear strength can be improved without lowering the peeling strength of the welded joint portion.

Furthermore, the flux-cored wire 1 for laser welding of different materials of this embodiment has a packing fraction of the flux 1b define to be in an appropriate range, and therefore the reducing action of the flux can be effectively obtained without lowered tensile shear strength and peeling strength.

In this embodiment, as already mentioned, when the aluminum alloy material 2 and the steel material 3 are bonded by lap welding, it is desirable that the aluminum alloy material 2 is disposed on the laser light. In the present invention, however, the radiation position of the laser light and the feeding position of the flux-cored wire 1 are not limited as long as the base materials can be fused into each other and an appropriate amount of the flux-cored wire 1 can be fed into the molten pool of the molten metal by fusing the wire.

Figure 3:
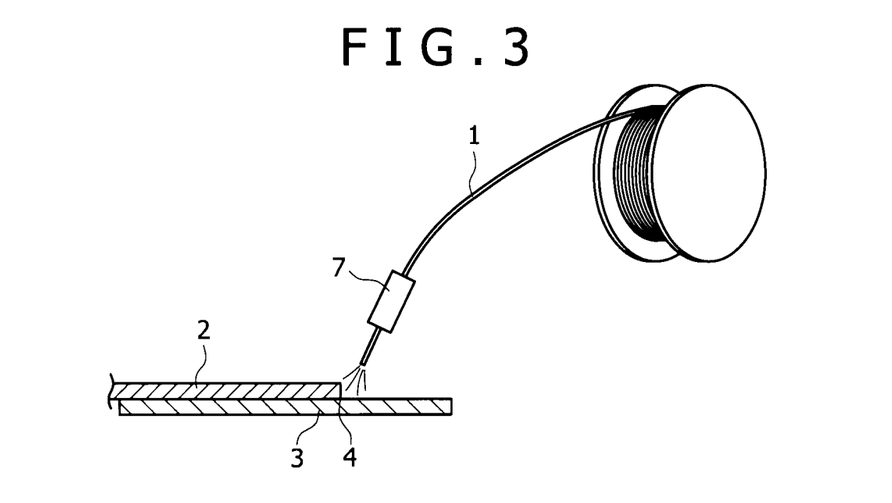
FIG. 3 is a schematic diagram which illustrates lap welding by the method for MIG welding of different materials of the present invention.

Embodiments of the method for MIG welding of different materials according to the present invention will be now described. A welding wire used in MIG welding is the same as the welding wire 1 used in the method for laser welding of different materials. In addition, conditions and the like for MIG welding are similar to those in a normal MIG welding. FIG. 3 is a schematic diagram which illustrates a welding method in case of lap welding. First, a joint portion is constituted by the aluminum alloy material 2 and the steel material 3. When the joint portion is produced by lap welding, as shown in FIG. 3, the plate-like aluminum material 2 and the steel material 3 are overlapped, and, for example, the aluminum alloy material 2 is disposed on the side of a torch 7. In such a manner, by disposing the aluminum alloy material 2 on the side of the torch 7, the aluminum alloy material 2 having a low melting point can be fused earlier than the steel material 3, and subsequently the steel material 3 disposed below the aluminum alloy material 2 can be partly fused. Therefore, dripping of the molten metal from the molten pool can be prevented more effectively and lap welding can be more smoothly performed than in the case where the steel material 3 is disposed on the side of the torch 7 to perform lap welding.

Figure 4:
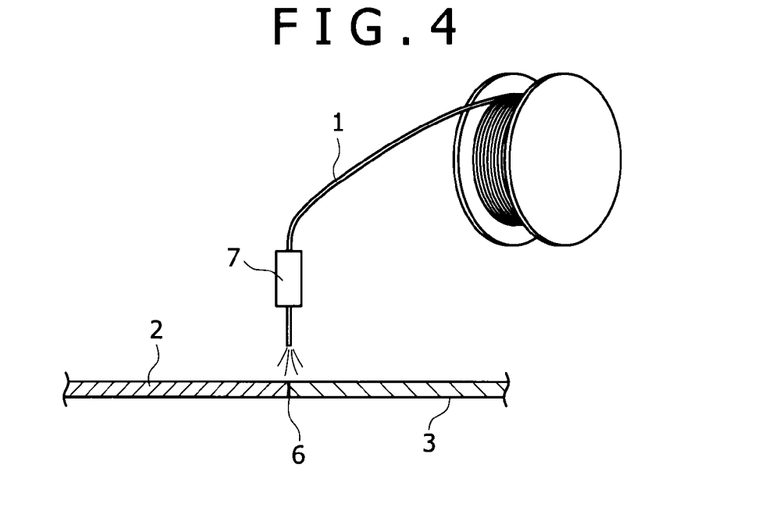
FIG. 4 is a schematic diagram which illustrates butt welding by the method for MIG welding of different materials of the present invention.
Figure 5A:
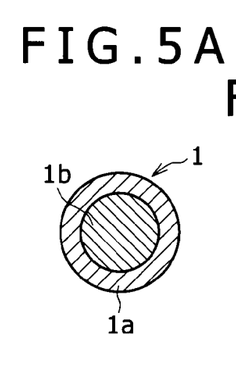
FIGS. 5A to 5D are drawings which illustrate an example of the flux-cored wire for welding different materials.
Figures 5B, 5C, 5D:
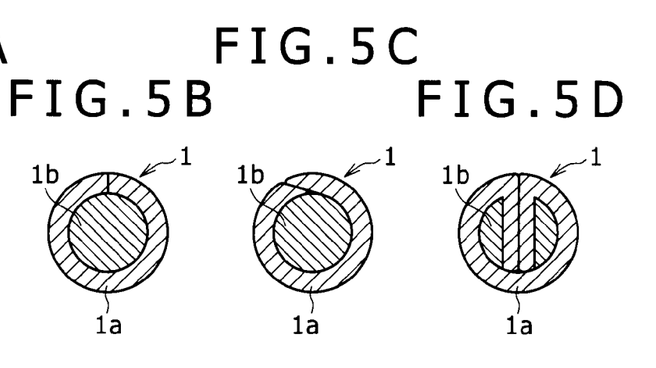

When the joint portion is produced by butt welding, as shown in FIG. 4, the aluminum material 2 and the steel material 3 are abutted. In both cases of FIGS. 3 and 4, an inert gas such as an argon gas or a helium gas is fed to the vicinity of the welding wire 1 fed from the torch 7 to the joint portion and the molten pool, so that oxygen in the air is prevented from entering the molten pool and oxidation of the molten metal is suppressed.

The method for MIG welding of different materials using this flux-cored wire for welding different materials of the present invention also has effects similar to those produced by the method for laser welding of different materials using the flux-cored wire for welding different materials of the present invention.

EXAMPLES

First Example

Examples which indicate the effects of the flux-cored wire for laser welding of different materials of the present invention will be specifically described below by comparing to Comparative Examples. A plate material (for example, width: 100 mm, length: 300 mm) comprising AA6022 alloy (JIS A 6000 series alloy) and having a plate thickness of 1.0 mm was used as the aluminum alloy material 2. In addition, a 980 MPa-grade cold-rolled steel plate having a plate thickness of 1.4 mm (for example, width: 100 mm, length: 300 mm) and two types of steel plates which were produced by treating the same steel plate with hot-dip galvanizing were used as the steel material 3. As test materials to be welded, aluminum alloy materials 2 and steel materials 3 which are unprocessed plate materials, and bent plate materials which were bend 90 degrees at positions at an appropriate distance from their edges (as for aluminum alloy materials 2, 10 mm from their edges; as for the steel materials 3, 60 mm from their edges) were used.

Thereafter, these aluminum alloy material 2 and the galvanized steel material 3 are overlapped; the aluminum alloy material 2 is disposed on the laser light side as shown in FIG. 1; and the vicinity of the lapped portion 4 was placed in a shielding gas atmosphere. An argon gas was used as the shielding gas. Laser light was radiated on the lapped portion 4 while each of the flux-cored wires for welding different materials (diameter 1.2 mm) of Examples and Comparative Examples were fed to the lapped portion 4, conducting laser welding. The lasers radiated on the lapped portion 4 were continuous wave oscillation type YAG (Yttrium-Aluminum Garnet) laser (laser output 4.0 kW) and semiconductor laser (laser output: 4.0 kW). The welding speed was 1.2 m/min. with YAG, while it was 1.5 m/min. with semiconductor laser. In addition, the wire feed speed was 4.8 m/min. with YAG, while it was 3 m/min. with semiconductor laser.

Figure 6:
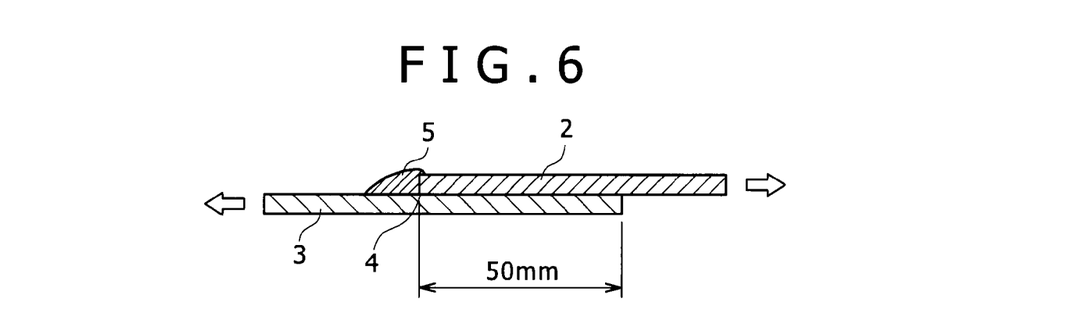
FIG. 6 is a drawing which illustrates a tensile shear strength test of a joint portion according to an embodiment of the present invention.
Figure 7:
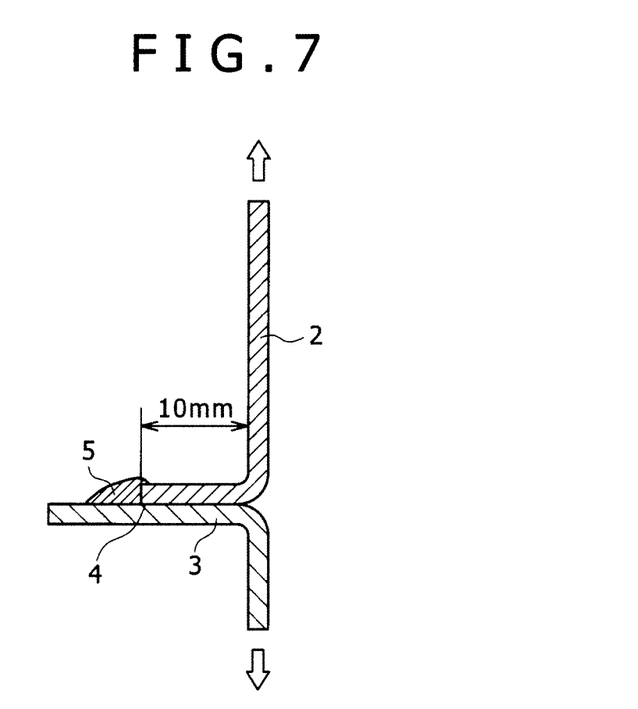
FIG. 7 is a drawing which illustrates a peeling strength test of a welded portion interface according to an embodiment of the present invention.

When plate materials were used as components to be welded, as shown in FIG. 6, they were disposed so that the length the lapped portion 4 of the lapped components was 50 mm. In addition, when bent plate materials were used as components to be welded, as shown in FIG. 7, the components 2 and 3 were disposed so that the bent positions of the components 2 and 3 coincided, and the length of the lapped portion 4 of the components was 10 mm.

As for the flux-cored wires for welding different materials used for Examples and Comparative Examples used in this Example, the chemical compositions of the sheath, chemical compositions of the flux and packing fractions of the flux are shown in Table 1 below. In addition, the presence or absence of cracks in the welded metal portion when welding was conducted using these wires, tensile strength and peeling strength are shown in Tables 2 to 5 below. Tables 2 and 4 show the results from the case where YAG laser was used to weld a non-galvanized steel plate, while Tables 3 and 5 show the results from the case where semiconductor laser was used to weld a non-galvanized steel plate.

The aluminum alloy material to be welded is AA6022. The steel material to be welded is a non-galvanized steel plate in Tables 1 and 2, while it is GA980 in Tables 3 and 4. The thickness of the aluminum alloy material is 1.0 mm, and the thickness of the steel material is 1.4 mm. In the case of YAG laser, the output was 4 kW; the welding speed was 1.2 m/min.; and the wire feed speed was 4.8 m/min. In the case of the semiconductor laser, the output was 4 kW; the welding speed was 1.5 m/min.; and the wire feed speed was 3 m/min.

In Table 1, the amount of CsF contained as a composition of the flux was varied, but the remainder of this flux is substantially comprised of a KAlF (potassium aluminum fluoride)-based flux. Examples of such KAlF-based fluxes include those containing 75% by mass of $KAlF_4$ and 25% by mass of $K_3AlF_6$. Alternatively, there are also such fluxes in which these potassium aluminum fluoride-based compounds are partly replaced with $K_2AlF_6$. Furthermore, compounds containing no Al such as KF may also be included in some cases. Accordingly, a flux which is composed substantially of KAlF means a compound comprising the three elements, K, Al and F, and a compound which is composed of two elements, K and F, or mixtures of these compounds. It should be noted that the indication tr in Table 1 denotes a trace amount.

TABLE 1

| | Sheath | | Flux | |
|---|---|---|---|---|
| | Si | Zr | CsF | Packing fraction |
| Comparative Example 1 | 1.45 | t r | 30 | 10 |
| Comparative Example 2 | 1.45 | 0.2 | 30 | 10 |
| Comparative Example 3 | 1.50 | t r | 30 | 10 |
| Example 1 | 1.50 | 0.2 | 30 | 10 |
| Comparative Example 4 | 1.75 | t r | 30 | 10 |
| Example 2 | 1.75 | 0.07 | 30 | 10 |
| Example 3 | 1.75 | 0.1 | 30 | 10 |
| Example 4 | 1.75 | 0.25 | 30 | 10 |
| Comparative Example 5 | 1.75 | 0.3 | 30 | 10 |
| Comparative Example 6 | 2.00 | t r | 30 | 10 |
| Example 5 | 2.00 | 0.07 | 30 | 10 |
| Example 6 | 2.00 | 0.1 | 30 | 10 |
| Example 7 | 2.00 | 0.25 | 30 | 10 |
| Comparative Example 7 | 2.00 | 0.3 | 30 | 10 |
| Comparative Example 8 | 2.50 | t r | 30 | 10 |
| Example 8 | 2.50 | 0.2 | 30 | 10 |
| Comparative Example 8 | 2.75 | t r | 30 | 10 |
| Comparative Example 9 | 2.75 | 0.2 | 30 | 10 |
| Comparative Example 10 | 2.00 | 0.25 | 15 | 10 |
| Comparative Example 11 | 2.00 | 0.25 | 65 | 10 |
| Comparative Example 12 | 2.00 | 0.25 | 30 | 3 |
| Comparative Example 13 | 2.00 | 0.25 | 30 | 25 |
| Example 9 | 2.50 | 0.2 | 30 | 10 |
| Example 10 | 1.50 | 0.2 | 30 | 10 |
| Comparative Example 14 | 2.00 | 0.25 | — | 0 |

TABLE 2

AA6022 - Non-galvanized steel plate YAG laser

| | Cracks in welded metal portion | TSS | PS | Overall evaluation |
|---|---|---|---|---|
| Comparative example 1 | E | 195 | 32 | Poor |
| Comparative example 2 | D | 189 | 33 | Poor |
| Comparative example 3 | D | 188 | 27 | Poor |
| Example 1 | B | 205 | 21 | Good |
| Comparative example 4 | D | 199 | 24 | Poor |
| Example 2 | B | 203 | 25 | Good |
| Example 3 | B | 211 | 38 | Excellent |
| Example 4 | B | 211 | 29 | Good |
| Comparative example 5 | B | 197 | 14 | Poor |
| Comparative example 6 | C | 212 | 13 | Poor |
| Example 5 | A | 211 | 38 | Excellent |
| Example 6 | A | 213 | 35 | Excellent |
| Example 7 | B | 213 | 18 | Good |
| Comparative example 7 | B | 198 | 12 | Poor |
| Comparative example 8 | B | 213 | 13 | Poor |
| Example 8 | A | 216 | 38 | Excellent |
| Comparative example 8 | B | 210 | 9 | Poor |
| Comparative example 9 | B | 213 | 12 | Poor |
| Comparative example 10 | B | 187 | 11 | Poor |
| Comparative example 11 | B | 191 | 10 | Poor |
| Comparative example 12 | B | 195 | 8 | Poor |
| Comparative example 13 | B | 180 | 7 | Poor |
| Example 9 | B | 202 | 17 | Good |
| Example 10 | B | 202 | 18 | Good |
| Comparative example 14 | A | 97 | 3 | Poor |

TABLE 3

AA6022 - Non-galvanized steel plate Semiconductor laser

| | Cracks in welded metal portion | TSS | PS | Overall evaluation |
|---|---|---|---|---|
| Comparative example 1 | E | 186 | 34 | Poor |
| Comparative example 2 | E | 191 | 29 | Poor |
| Comparative example 3 | E | 187 | 27 | Poor |
| Example 1 | B | 205 | 22 | Good |
| Comparative example 4 | D | 202 | 25 | Poor |
| Example 2 | B | 204 | 26 | Good |
| Example 3 | B | 206 | 27 | Good |
| Example 4 | B | 208 | 24 | Good |
| Comparative example 5 | B | 189 | 11 | Poor |
| Comparative example 6 | C | 209 | 15 | Poor |
| Example 5 | A | 210 | 25 | Good |
| Example 6 | A | 211 | 40 | Excellent |
| Example 7 | B | 212 | 35 | Excellent |
| Comparative example 7 | B | 196 | 13 | Poor |
| Comparative example 8 | B | 211 | 11 | Poor |
| Example 8 | A | 209 | 23 | Good |
| Comparative example 8 | B | 208 | 12 | Poor |
| Comparative example 9 | B | 207 | 8 | Poor |
| Comparative example 10 | B | 174 | 21 | Poor |
| Comparative example 11 | B | 123 | 20 | Poor |
| Comparative example 12 | B | 158 | 9 | Poor |
| Comparative example 13 | B | 168 | 1 | Poor |
| Example 9 | B | 202 | 17 | Good |
| Example 10 | B | 207 | 16 | Good |
| Comparative example 14 | A | 102 | 3 | Poor |

TABLE 4

AA6022 - GA980 YAG laser

| | Cracks in Al welded metal portion | TSS | PS | Overall evaluation |
|---|---|---|---|---|
| Comparative example 1 | E | 192 | 31 | Poor |
| Comparative example 2 | D | 187 | 34 | Poor |
| Comparative example 3 | D | 191 | 26 | Poor |

TABLE 4-continued

AA6022 - GA980 YAG laser

| | Cracks in Al welded metal portion | TSS | PS | Overall evaluation |
|---|---|---|---|---|
| Example 1 | B | 205 | 21 | Good |
| Comparative example 4 | D | 202 | 24 | Poor |
| Example 2 | B | 203 | 22 | Good |
| Example 3 | B | 208 | 25 | Good |
| Example 4 | B | 207 | 22 | Good |
| Comparative example 5 | B | 190 | 12 | Poor |
| Comparative example 6 | C | 204 | 9 | Poor |
| Example 5 | B | 212 | 30 | Excellent |
| Example 6 | A | 215 | 32 | Excellent |
| Example 7 | B | 211 | 22 | Good |
| Comparative example 7 | B | 189 | 11 | Poor |
| Comparative example 8 | B | 210 | 9 | Poor |
| Example 8 | A | 213 | 25 | Good |
| Comparative example 8 | B | 212 | 8 | Poor |
| Comparative example 9 | B | 214 | 10 | Poor |
| Comparative example 10 | B | 191 | 3 | Poor |
| Comparative example 11 | B | 190 | 9 | Poor |
| Comparative example 12 | B | 180 | 8 | Poor |
| Comparative example 13 | B | 180 | 2 | Poor |
| Example 9 | B | 203 | 17 | Good |
| Example 10 | B | 205 | 16 | Good |
| Comparative example 14 | A | 70 | 1 | Poor |

TABLE 5

AA6022 - GA980 YAG laser

| | Cracks in Al welded metal portion | TSS | PS | Overall evaluation |
|---|---|---|---|---|
| Comparative example 1 | E | 187 | 29 | Poor |
| Comparative example 2 | E | 192 | 31 | Poor |
| Comparative example 3 | D | 192 | 28 | Poor |
| Example 1 | B | 203 | 21 | Good |
| Comparative example 4 | D | 201 | 24 | Poor |
| Example 2 | B | 204 | 25 | Good |
| Example 3 | B | 207 | 28 | Good |
| Example 4 | B | 210 | 24 | Good |
| Comparative example 5 | B | 195 | 14 | Poor |
| Comparative example 6 | C | 214 | 13 | Poor |
| Example 5 | A | 214 | 21 | Good |
| Example 6 | A | 214 | 31 | Excellent |
| Example 7 | B | 213 | 22 | Good |
| Comparative example 7 | B | 198 | 12 | Poor |
| Comparative example 8 | B | 213 | 11 | Poor |
| Example 8 | A | 214 | 23 | Good |
| Comparative example 8 | B | 212 | 9 | Poor |
| Comparative example 9 | B | 213 | 12 | Poor |
| Comparative example 10 | B | 185 | 5 | Poor |
| Comparative example 11 | B | 189 | 6 | Poor |
| Comparative example 12 | B | 179 | 4 | Poor |
| Comparative example 13 | B | 180 | 3 | Poor |
| Example 9 | B | 201 | 16 | Good |
| Example 10 | B | 202 | 17 | Good |
| Comparative example 14 | A | 98 | 0 | Poor |

The plate material shown in FIG. 6 and the bent plate material shown in FIG. 7 were bonded by lap welding using the flux-cored wires of these Examples and Comparative Examples. The tensile shear strength (TSS) and peeling strength (PS) of the welded portion 5 welded were measured.

(Tensile Shear Strength Evaluation)

Tensile shear strength was evaluated by using a plate material subjected to lap welding shown in FIG. 6. The plate material after being welded was processed into a JIS No. 5 specimen as defined in JIS Z 2201-1998. At this time, the welded portion 5 was adjusted to be at the center of the parallel portion. Each of the plate materials was then pulled in the direction of the arrow in FIG. 6 using a tensile tester (manufactured by Shimadzu Corporation, uniaxial tester RS-2), and the tensile shear strength of the welded portion 5 was measured. The tensile shear strength of the welded portion 5 as for the case where the flux-cored wire of each of Examples and Comparative Examples was used to conduct welding is shown in Tables 2 to 5.

(Peeling Strength Evaluation)

Peeling strength was evaluated by using a bent plate material after being subjected to lap welding shown in FIG. 7. The plate material after being subjected to welding was processed into a 25-mm wide strip. Each of the plate materials was then pulled in the direction of the arrow in FIG. 7 using a tensile tester (manufactured by Shimadzu Corporation, uniaxial tester RS-2), and the peeling strength of the welded portion 5 was measured. The peeling strength of the welded portion 5 as for the case where each of the flux-cored wires of Examples and Comparative Examples was used to conduct welding is shown in Tables 2 to 5 collectively.

In the evaluation of cracks, the test material was judged A when no crack was found; B when there was no crack but cocrystals were present at grain boundaries; C when a crack which was equivalent to one grain boundary was present; D when cracks which were equivalent to several grain boundaries were present; and E when large cracks were generated. In overall evaluation, each of the specimens of Examples and Comparative Examples was judged excellent when the tensile shear strength was 210 [N/mm] or higher, the peeling strength was 30 [N/mm] or higher, and no crack was found; good when the tensile shear strength was 200 [N/mm] or higher, the peeling strength was 15 [N/mm] or higher, and no crack was present but cocrystals were generated at grain boundaries (B); poor when the tensile shear strength was lower than 200 [N/mm] or the peeling strength was lower than 15 [N/mm] or a crack equivalent to a single grain boundary (C) or cracks equivalent to several grain boundaries (D) or large cracks (E) were generated.

As shown in Tables 2 to 5, in Examples 1 to 10, in both of the cases of YAG laser and semiconductor laser, cesium fluoride in the flux, packing fraction of the flux, and the amounts of Si and Zr in the sheath fall within the range of the present invention, and therefore their tensile shear strength and peeling strength were improved compared to Comparative Examples 1 to 14 which do not fall within the range of the present invention, and no crack generated in their welded metal portions. In addition, in the case of semiconductor laser, more uniform and beautiful beads were formed than in the case of YAG laser.

Second Example

Examples of the method for MIG welding of different materials using the flux-cored wires for welding different materials of the present invention will be now specifically described by comparing to Comparative Examples. A plate material (for example, width: 100 mm, length: 300 mm) comprising AA6022 alloy (JIS A 6000 series alloy) and having a plate thickness of 2.0 mm was used as the aluminum alloy material 2. In addition, a 980 MPa-grade cold-rolled steel plate having a plate thickness of 1.4 mm (for example, width: 100 mm, length: 300 mm) or a galvanized steel plate produced by galvanizing the same steel plate was used as the galvanized steel plate. As test materials to be welded, aluminum alloy materials 2 and steel materials 3 which are unprocessed plate materials, and bent plate materials which were bent 90 degrees at positions at an appropriate distance from their edges (as for aluminum alloy materials 2, 10 mm from their edges; as for the steel materials 3, 60 mm from their edges) were used.

These aluminum alloy material 2 and steel material 3 were then overlapped, and as shown in FIG. 3, the aluminum alloy material 2 was disposed on the side of the MIG torch 7, and the vicinity of the lapped portion 4 was placed in a shielding gas atmosphere. An argon gas was used as the shielding gas. The lapped portion 4 was then energized by using each of the flux-cored wires for welding different materials of Examples and Comparative Examples (diameter: 1.2 mm), and lap MIG welding was conducted. As a MIG welding machine for welding the lapped portion 4, a direct current pulse MIG welding power source was used. The current was 90 A, the voltage was 16 V, and the welding speed was 0.5 m/min.

When plate materials were used as components to be welded, as shown in FIG. 6, the components were disposed so that the length of the lapped portion 4 of the components was 50 mm. In addition, when bent plate materials were used as components to be welded, as shown in FIG. 7, the components 2 and 3 were disposed so that the bent positions of the components 2 and 3 coincided, and the length of the lapped portion 4 of the components was 10 mm.

As for the flux-cored wires for welding different materials of Examples and Comparative Examples used in this Example, the chemical compositions of the flux, the packing fractions of the flux and the chemical compositions of the sheath are shown in Table 6 below. It should be noted that the indication tr in Table 6 denotes a trace amount. Furthermore, the plate material shown in FIG. 6 and the bent plate material shown in FIG. 7 were bonded by lap welding using the flux-cored wires of these Examples and Comparative Examples. The tensile shear strength and peeling strength of the welded portion 5 produced by lap welding were measured. The presence or absence of cracks, tensile strength and peeling strength of this welded portion are shown in Table 7 below.

TABLE 6

|  | Sheath (% by mass) | | | Flux (% by mass) | |
| --- | --- | --- | --- | --- | --- |
|  | Steel plate | Si | Zr | AlF | Packing fraction |
| Comparative example 1 | GA steel plate | 1.45 | tr | 10 | 12 |
| Comparative example 2 |  | 1.45 | 0.2 |  |  |
| Comparative example 3 |  | 1.50 | tr |  |  |
| Example 1 |  | 1.50 | 0.2 |  |  |
| Comparative example 4 |  | 1.75 | tr |  |  |
| Example 2 |  | 1.75 | 0.07 |  |  |
| Example 3 |  | 1.75 | 0.1 |  |  |
| Example 4 |  | 1.75 | 0.25 |  |  |
| Comparative example 5 |  | 1.75 | 0.3 |  |  |
| Comparative example 6 | Non-galvanized steel plate | 1.75 | tr |  |  |
| Example 5 |  | 1.75 | 0.07 |  |  |
| Example 6 |  | 1.75 | 0.1 |  |  |
| Example 7 |  | 1.75 | 0.25 |  |  |
| Comparative example 7 |  | 1.75 | 0.3 |  |  |
| Comparative example 8 | GA steel plate | 2.00 | tr |  |  |
| Example 8 |  | 2.00 | 0.07 |  |  |
| Example 9 |  | 2.00 | 0.1 |  |  |
| Example 10 |  | 2.00 | 0.25 |  |  |
| Comparative example 9 |  | 2.00 | 0.3 |  |  |
| Comparative example 10 |  | 2.00 | 0.2 | 5 |  |
| Example 11 |  | 2.00 | 0.2 | 7 |  |
| Example 12 |  | 2.00 | 0.2 | 15 |  |
| Comparative example 11 |  | 2.00 | 0.2 | 17 |  |
| Comparative example 12 |  | 2.00 | 0.2 | 10 | 3 |
| Example 13 |  | 2.00 | 0.2 |  | 4 |
| Example 14 |  | 2.00 | 0.2 |  | 19 |
| Comparative example 13 |  | 2.00 | 0.2 |  | 21 |

TABLE 6-continued

|  | Steel plate | Sheath (% by mass) | | Flux (% by mass) | |
|---|---|---|---|---|---|
|  |  | Si | Zr | AlF | Packing fraction |
| Comparative example 14 |  | 2.50 | t r |  | 12 |
| Example 15 |  | 2.50 | 0.2 |  |  |
| Comparative example 15 |  | 2.75 | t r |  |  |
| Comparative example 16 |  | 2.75 | 0.2 |  |  |

TABLE 7

AA6022 - GA980 or non-galvanized steel plate, direct current MIG welding

|  | Cracks | TSS | PS | Overall evaluation |
|---|---|---|---|---|
| Comparative example 1 | E | 270 | 12 | Poor |
| Comparative example 2 | C | 275 | 12 | Poor |
| Comparative example 3 | D | 280 | 11 | Poor |
| Example 1 | B | 310 | 18 | Good |
| Comparative example 4 | D | 290 | 15 | Poor |
| Example 2 | B | 340 | 21 | Good |
| Example 3 | A | 350 | 23 | Excellent |
| Example 4 | A | 360 | 26 | Excellent |
| Comparative example 5 | A | 280 | 7 | Poor |
| Comparative example 6 | D | 300 | 17 | Poor |
| Example 5 | B | 350 | 23 | Good |
| Example 6 | A | 365 | 25 | Excellent |
| Example 7 | A | 370 | 28 | Excellent |
| Comparative example 7 | A | 290 | 8 | Poor |
| Comparative example 8 | D | 290 | 16 | Poor |
| Example 8 | B | 310 | 25 | Good |
| Example 9 | A | 360 | 25 | Excellent |
| Example 10 | A | 365 | 22 | Excellent |
| Comparative example 9 | C | 320 | 15 | Poor |
| Comparative example 10 | A | 290 | 9 | Poor |
| Example 11 | A | 340 | 15 | Good |
| Example 12 | A | 335 | 18 | Good |
| Comparative example 11 | A | 295 | 8 | Poor |
| Comparative example 12 | A | 245 | 5 | Poor |
| Example 13 | A | 310 | 18 | Good |
| Example 14 | A | 330 | 15 | Good |
| Comparative example 13 | A | 290 | 7 | Poor |
| Comparative example 14 | C | 280 | 16 | Poor |
| Example 15 | A | 300 | 18 | Good |
| Comparative example 15 | C | 270 | 14 | Poor |
| Comparative example 16 | B | 275 | 15 | Poor |

(Tensile Shear Strength Evaluation)

Tensile shear strength was evaluated using the plate material shown in FIG. 6 subjected to lap welding. The plate material after being welded was processed into a JIS No. 5 specimen as defined in JIS Z 2201-1998. At this time, the welded portion 5 was adjusted to be at the center of the parallel portion. Each of the plate materials was then pulled in the direction of the arrow in FIG. 4 using a tensile tester (manufactured by Shimadzu Corporation, uniaxial tester RS-2), and the tensile shear strength of the welded portion 5 was measured. The tensile shear strength of the welded portion 5 in the case where welding was performed using each of the flux-cored wires of Examples and Comparative Examples is shown in Table 7.

(Peeling Strength Evaluation)

Peeling strength was evaluated using the bent plate material after being subjected to lap welding shown in FIG. 7. The plate material after being subjected to welding was processed into a 25-mm wide strip. Each of the plate materials was then pulled in the direction of the arrow in FIG. 7 using a tensile tester (manufactured by Shimadzu Corporation, uniaxial tester RS-2), and the peeling strength of the welded portion 5 was measured. The peeling strength of the welded portion 5 in the case where each of the flux-cored wires of Examples and Comparative Examples was used to conduct welding is shown in Table 7 collectively.

As in Example 1, in evaluation of cracks, the test material was judged A when no crack was found; B when no crack was generated but cocrystals were present at grain boundaries; C when a crack equivalent to a single grain boundary was present; D when large cracks were generated; and E when large cracks were generated. In overall evaluation, each of the specimens of Examples and Comparative Examples was judged excellent when the tensile shear strength was 350 [N/mm] or higher, peeling strength was 20 [N/mm] or higher, and no crack was found (A); good when the tensile shear strength was 300 [N/mm] or higher, the peeling strength was 10 [N/mm] or higher, and no crack was generated but cocrystals were generated at grain boundaries (B); and poor when the tensile shear strength was lower than 300 [N/mm] or the peeling strength was lower than 10 [N/mm] or a crack equivalent to a single grain boundary (C) or cracks equivalent to several grain boundaries (D) or large cracks (E) generated.

As shown in this Table 7, the amounts of $AlF_3$ in the flux, the packing fraction of the flux, and the chemical compositions of Si and Zr in the sheath in Examples 1 to 15 fall within the range of the present invention, and therefore their tensile shear strength and peeling strength were improved and no crack generated in their welded metal portion. In contrast, Comparative Examples 1 to 16 which do not fall within the range of the present invention had cracks, low tensile strength or low peeling strength.

What is claimed is:

1. A flux-cored wire for welding different materials for use in different-material bonding between aluminum or an aluminum alloy material and a steel material,
    the flux-cored wire comprising a cylindrical sheath comprising an aluminum alloy which contains from 1.5 to 2.5% by mass of Si and from 0.05 to 0.25% by mass of Zr, with the remainder being aluminum and inevitable impurities, and a flux filling inside the cylindrical sheath and containing from 20 to 60% by mass of cesium fluoride, and
    the packing fraction of the flux-cored wire is from 5 to 20% by mass of the total mass of the wire.

2. A flux-cored wire for welding different materials for use in different-material bonding between aluminum or an aluminum alloy material and a steel material,
    the flux-cored wire comprising a cylindrical sheath comprising an aluminum alloy which contains from 1.5 to 2.5% by mass of Si and from 0.05 to 0.25% by mass of Zr, with the remainder being aluminum and inevitable impurities, and a flux filling inside the cylindrical sheath and containing from 7 to 15% by mass of $AlF_3$, and
    the packing fraction of the flux-cored wire is from being 4 to 20% by mass of the total mass of the wire.

3. A method for laser welding of different materials, the method comprising:
    constituting a joint portion by aluminum or an aluminum alloy material and a steel material; and
    bonding the aluminum or aluminum alloy material and the steel material by feeding a flux-cored wire for welding different materials while irradiating this joint portion with laser light,
    wherein the flux-cored wire comprises
    a cylindrical sheath comprising an aluminum alloy which contains from 1.5 to 2.5% by mass of Si and from 0.05 to 0.25% by mass of Zr, with the remainder being aluminum and inevitable impurities, and a flux filling inside the cylindrical sheath and containing from 20 to 60% by mass of cesium fluoride, and the packing fraction of the flux-cored wire is from 5 to 20% by mass of the total mass of the wire.

4. The method for laser welding of different materials according to claim 3, wherein the aluminum or aluminum alloy material and the steel material are overlapped so that the aluminum or aluminum alloy material is placed on the laser light side, and the aluminum or aluminum alloy material and the steel material are bonded by lap welding.

5. The method for laser welding of different materials according to claim 3 or 4, wherein laser welding is performed by semiconductor laser.

6. A method for MIG welding of different materials, the method comprising:

providing a flux-cored wire for welding different materials;

constituting a joint portion by aluminum or an aluminum alloy material and a steel material; and forming an arc between the joint portion and the flux-cored wire for welding different materials, feeding an inert gas around the arc, and at the same time bonding the aluminum or aluminum alloy material and the steel material, wherein the flux-cored wire comprises a cylindrical sheath comprising an aluminum alloy which contains from 1.5 to 2.5% by mass of Si and from 0.05 to 0.25% by mass of Zr, with the remainder being aluminum and inevitable impurities, and a flux filling inside the cylindrical sheath and containing from 20 to 60% by mass of cesium fluoride, and the packing fraction of the flux-cored wire is from 5 to 20% by mass of the total mass of the wire.

7. The method for MIG welding of different materials according to claim 6, wherein the aluminum or aluminum alloy material and the steel material are overlapped so that the aluminum or aluminum alloy material is placed on the side of the flux-cored wire for welding different materials, and the aluminum or aluminum alloy material and the steel material are bonded by lap welding.

8. A method for laser welding of different materials, the method comprising:

constituting a joint portion by aluminum or an aluminum alloy material and a steel material; and bonding the aluminum or aluminum alloy material and the steel material by feeding a flux-cored wire for welding different materials while irradiating this joint portion with laser light, wherein the flux-cored wire comprises a cylindrical sheath comprising an aluminum alloy which contains from 1.5 to 2.5% by mass of Si and from 0.05 to 0.25% by mass of Zr, with the remainder being aluminum and inevitable impurities, and a flux filling inside the cylindrical sheath and containing from 7 to 15% by mass of $AlF_3$, and the packing fraction of the flux-cored wire is from 4 to 20% by mass of the total mass of the wire.

9. The method for laser welding of different materials according to claim 8, wherein the aluminum or aluminum alloy material and the steel material are overlapped so that the aluminum or aluminum alloy material is placed on the laser light side, and the aluminum or aluminum alloy material and the steel material are bonded by lap welding.

10. The method for laser welding of different materials according to claim 8 or 9, wherein laser welding is performed by semiconductor laser.

11. A method for MIG welding of different materials, the method comprising:

providing a flux-cored wire for welding different materials;

constituting a joint portion by aluminum or an aluminum alloy material and a steel material; and forming an arc between the joint portion and the flux-cored wire for welding different materials, feeding an inert gas around the arc, and at the same time bonding the aluminum or aluminum alloy material and the steel material, wherein the flux-cored wire comprises a cylindrical sheath comprising an aluminum alloy which contains from 1.5 to 2.5% by mass of Si and from 0.05 to 0.25% by mass of Zr, with the remainder being aluminum and inevitable impurities, and a flux filling inside the cylindrical sheath and containing from 7 to 15% by mass of $AlF_3$, and the packing fraction of the flux-cored wire is from 4 to 20% by mass of the total mass of the wire.

* * * * *